United States Patent
LaTray et al.

(10) Patent No.: US 11,674,546 B2
(45) Date of Patent: Jun. 13, 2023

(54) GAS FOIL THRUST BEARINGS HAVING TOP FOILS INCORPORATING POCKET RECESSES

(71) Applicant: Board of Regents, The University of Texas System, Austin, TX (US)

(72) Inventors: Nguyen LaTray, Arlington, TX (US); Daejong Kim, Arlington, TX (US)

(73) Assignee: Board of Regents, The University of Texas System, Austin, TX (US)

( * ) Notice: Subject to any disclaimer, the term of this patent is extended or adjusted under 35 U.S.C. 154(b) by 0 days.

(21) Appl. No.: 17/110,116

(22) Filed: Dec. 2, 2020

(65) Prior Publication Data

US 2021/0324908 A1 Oct. 21, 2021

Related U.S. Application Data

(60) Provisional application No. 62/942,435, filed on Dec. 2, 2019.

(51) Int. Cl.
*F16C 17/04* (2006.01)
*F16C 33/10* (2006.01)

(52) U.S. Cl.
CPC .......... *F16C 17/042* (2013.01); *F16C 33/101* (2013.01)

(58) Field of Classification Search
CPC ...... F16C 17/04; F16C 17/042; F16C 17/045; F16C 17/047
See application file for complete search history.

(56) References Cited

U.S. PATENT DOCUMENTS

| 4,277,112 | A | * | 7/1981 | Heshmat | F16C 17/042 384/124 |
| 4,296,976 | A | * | 10/1981 | Heshmat | F16C 17/024 384/309 |
| 5,961,217 | A | | 10/1999 | Heshmat | |
| 9,157,473 | B2 | * | 10/2015 | Park | F16C 27/02 |
| 10,138,934 | B2 | * | 11/2018 | Omori | F16C 17/24 |
| 10,161,444 | B2 | * | 12/2018 | Lee | F16C 17/042 |
| 2012/0207414 | A1 | * | 8/2012 | Kim | F16C 17/042 384/105 |

FOREIGN PATENT DOCUMENTS

| DE | 202018104328 | * | 9/2018 |
| JP | 4420299 B2 | | 12/1998 |
| JP | 2006183786 | * | 7/2006 |
| WO | WO2016/129579 | * | 8/2016 |

OTHER PUBLICATIONS

Masayoshi Otsuka. "Self-acting, Air-lubricated Bearing without Oil Lubrication". R&D Review of Toyota CRDL. vol. 41, No. 1, pp. 24-35. 2006.

* cited by examiner

*Primary Examiner* — James Pilkington
(74) *Attorney, Agent, or Firm* — Thomas Horstemeyer, LLC

(57) ABSTRACT

In one embodiment, a gas foil thrust bearing includes multiple arcuate bearing pads, each bearing pad including a top foil and a compliant support element, each top foil having a leading edge, a trailing edge, and a top surface that extends from the leading edge to the trailing edge, the top surface having a taper-flat-recess configuration in which the top surface includes a taper region located near the leading edge, a flat land region located near the trailing edge, and a pocket recess defined by a base, opposed side walls, and an end wall.

19 Claims, 14 Drawing Sheets

GAS FOIL THRUST BEARINGS HAVING TOP FOILS INCORPORATING POCKET RECESSES

CROSS-REFERENCE TO RELATED APPLICATION

This application claims priority to U.S. Provisional Application Ser. No. 62/942,435, filed Dec. 2, 2019, which is hereby incorporated by reference herein in its entirety.

BACKGROUND

Gas foil bearings have been incorporated into many applications since the technology was first introduced in the 1970s. Despite many successful integrations of that technology, broadening gas foil bearing applications remains challenging. One of the reasons for this is the limited load capacity and high power losses of axial thrust bearings. Often, an existing system with a high thrust load must be redesigned in order to adapt it to gas foil bearings. This involves the redesigning aerodynamic components to reduce the thrust load and alternative machine architectures to enable proper cooling flow for the bearings. These challenges have deterred adaptation of gas foil bearing technology into many potential turbomachinery systems. In view of this, it would be desirable to have improved gas foil thrust bearings for use in various applications, including turbomachinery systems.

BRIEF DESCRIPTION OF THE DRAWINGS

The present disclosure may be better understood with reference to the following figures. Matching reference numerals designate corresponding parts throughout the figures, which are not necessarily drawn to scale.

DETAILED DESCRIPTION

Figure 1:
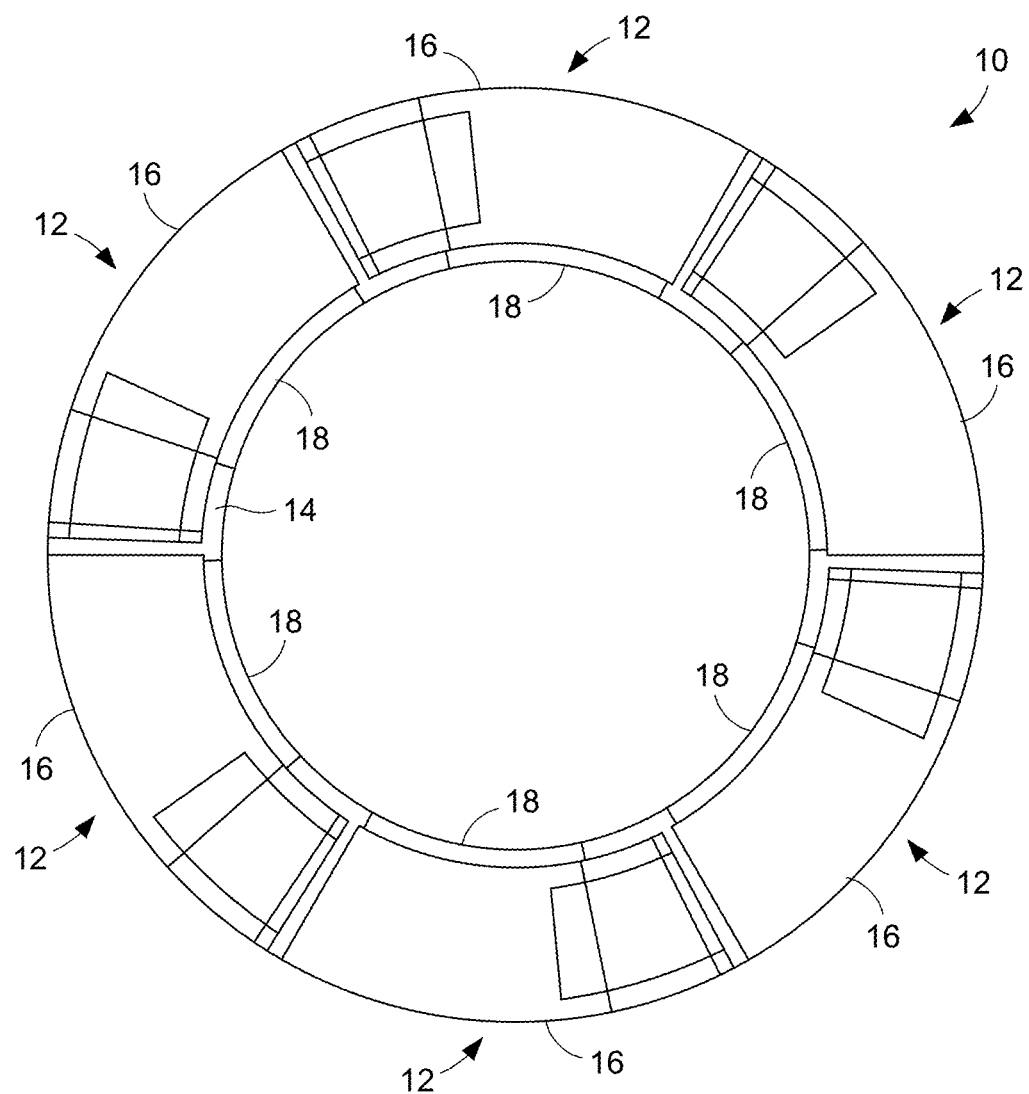
FIG. 1 is a plan view of an embodiment of a gas foil thrust bearing (GFTB) including top foils that incorporate pocket recesses.

As noted above, it would be desirable to have improved gas foil thrust bearings for use in various applications, including turbomachinery systems. Examples of such gas foil thrust bearings are disclosed herein. In some embodiments, the gas foil thrust bearings comprise multiple arcuate bearing pads, each pad including a top foil having a taper region, a flat land region, and a pocket recess.

In the following disclosure, various specific embodiments are described. It is to be understood that those embodiments are example implementations of the disclosed inventions and that alternative embodiments are possible. Such alternative embodiments include hybrid embodiments that include features from different disclosed embodiments. All such embodiments are intended to fall within the scope of this disclosure.

NOMENCLATURE $\mu$ Viscosity
$Q_L$ Radial leakage flow rate
$p_a$ Ambient pressure
C Nominal film clearance
h, H Dimensional, non-dimensional film thickness
p, P Dimensional, non-dimensional film pressure
r Radial coordinate
$\theta$ Circumferential coordinate
$\omega$ Angular velocity
L Power loss
$R_o$, $R_i$ Outer, inner radii
$\tau_p$, $\tau_c$ Poiseuille, Couette flow shear stresses
t Dimensional time w Plate deflection
D Flexural rigidity
$k_{bump}$ Areal bump structural stiffness bump Gas Foil Thrust Bearings Gas foil thrust bearings (GFTBs) are rotary bearings designed to confine axial movement, bear axial loads, and absorb axial vibrations. Such bearings include multiple arcuate top foils that are supported on a bearing backing plate by compliant support elements, typically in the form of corrugated bump structures. The compliance of the support elements accommodates large misalignment, shaft displacement, and absorbs mechanical energy from shaft vibration.

When working to improve GFTB static performance, there are several design parameters that should be considered before increasing the size of the bearing because larger bearings exhibit higher power losses and potentially create turbulence. While such a size increase may increase load capacity, it also generates greater power loss and it is more difficult to model and predict the bearing's performance. Table 1 shows the relationships between various bearing design parameters and performance parameters. The first four columns of the table highlight the design parameters that have been adopted by the gas foil bearing community to optimize gas foil thrust bearing performance. For example, there is an optimum value for taper height, which is about 8 to 10 times the minimum film thickness. As is known in the art, a "taper" is an angled or ramped portion of a bearing pad that is provided at the leading edge of the pad. The ratio of the taper angle-to-pad angle can be between 0.3 and 0.7, with 0.5 being the most common.

GFTBs typically comprise 5-9 bearing pads, depending on the thermal capacity of the working fluid. A larger number of pads results in the fluid being mixed with ambient pressure cooling flow more often. The gaps between pads can be wider to ensure proper mixing before the fluid enters the next pad. The effect of nominal clearance is easier to understand under the scope of a double-acting GFTB set. When the nominal clearance is reduced, the load capacity of the unloaded bearing is increased, thereby increasing the overall load capacity of the double-acting bearing set.

tribution profile, which reaches its maximum value where the taper ends and expands toward the trailing edge and side edges of the foil.

GFTBs Having Pocket Recesses

A pocket recess bearing is a multi-pad bearing in which a pocket recess is provided at each bearing pad's leading edge. The recesses function as pressure build-up mechanisms. Along the circumferential direction, pocket recess bearings having bearing geometries similar to those of step bearings, which increase pressure to satisfy mass continuity when fluid passes through composite film thickness profile. Along the radial direction, walls of the recesses reduce leakage at the outer and inner boundaries and, therefore, preserve film pressure. Analyses in computational fluid dynamics (CFD) and thin film lubrication theory show performance enhancing benefits of using pocket recesses.

A taper-flat configuration is more effective as a pressure build-up mechanism as compared to the pocket recess configuration. However, the taper-flat configuration allows high leakage flow across the radial direction. The highest leakage flow occurs at the transition zone from the taper portion to the flat portion, at which pressure is maximum.

Taper-Flat GFTBs Having Pocket Recesses (Taper-Flat-Recess GFTBs)

As noted above, the taper-flat configuration is more effective as a pressure build-up mechanism as compared to the pocket recess configuration, but allows high leakage flow across the radial direction. It has been determined that such leakage can be reduced, however, by adding pocket recesses to taper-flat top foils. In some embodiments, the pocket recesses can be located at the transition zones from the taper region to the flat land region of each top foil at which the pressure is at a maximum. By adding a pocket recess at that location, the radial flow is partially blocked without compromising benefits of the taper-flat configuration. This results in improvement of the GFTB's static performance.

FIG. 1 illustrates an example GFTB 10 comprising multiple bearing pads 12 that each have a taper-flat-recess configuration. Each pad 12 is supported on a bearing back-

TABLE 1

Design Parameters Affecting Bearing Performance

| | Taper height | Pad angle/no. of pads | Taper region to pad ratio | Nominal clearance | Added surface groove | Bump stiffness distribution | Bump pattern |
|---|---|---|---|---|---|---|---|
| Load capacity | X | X | X | X | X | | |
| Power loss | | X | X | | X | | |
| Leakage flow | | | | | X | | |
| Foil deflection uniformity | | | | | | X | X |
| Thermal/cooling management | | X | | X | | | X |
| Axial movement | | | | X | | X | |

Some GFTBs have progressive height bump structures under the taper portion. This prevents the top foil from sagging as high pressure builds toward the taper end. Many GFTBs only have bump supports under the flat land region downstream of the taper. In that case, use of a thicker top foil can minimize sagging. In addition, a large taper-to-pad angle ratio is undesirable because the taper portion of the top foil could deform without the supporting structure. Varying the bump locations within a bump foil can tailor the local bump stiffness. The main objective of tailoring of the bump stiffness distribution is to counterbalance the pressure dising plate 14 and includes a top foil 16 that is supported by a compliant support element 18, such as a corrugated bump foil. In the illustrated example, there are six pads 12, although a greater or a smaller number of pads can be used. In some embodiments, the number of pads 12 implemented in a GFTB can range from 4 to 8 pads.

Figure 2:
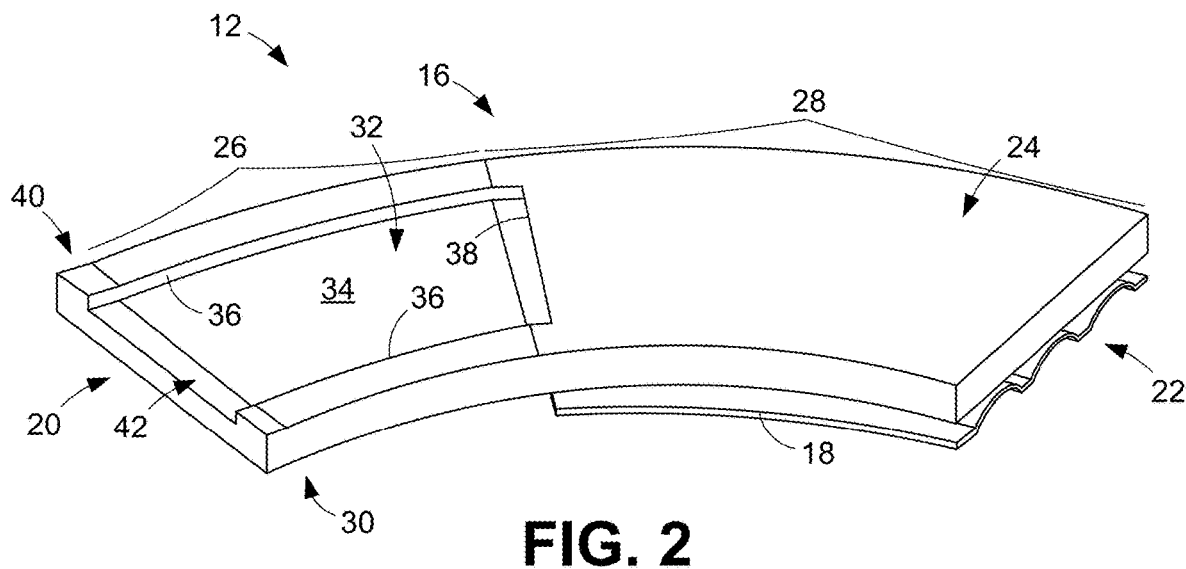
FIG. 2 is a top perspective view of an embodiment of a thrust pad that can be used in the GFTB of FIG. 1.
Figure 3A:
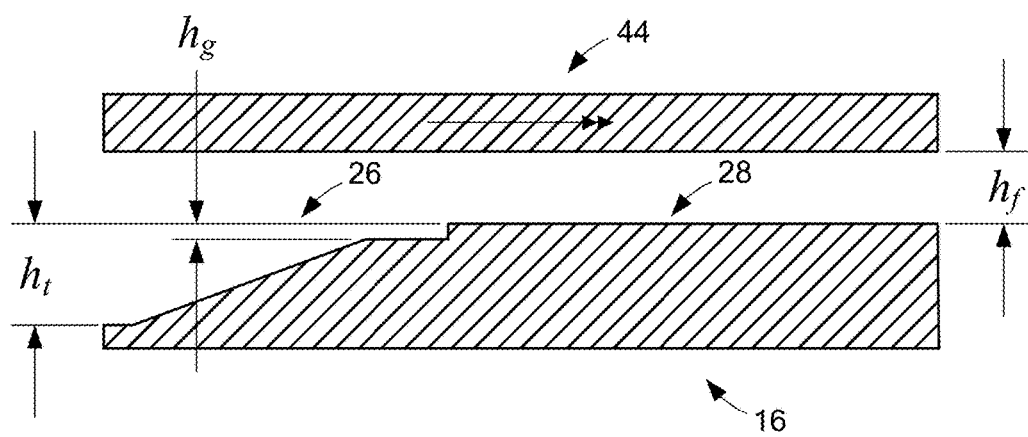
FIG. 3A is a side cross-sectional view of a top foil of the thrust pad of FIG. 2 (taken along a pocket recess of a top foil of the pad) that identifies geometric parameters of the top foil.

FIG. 2 illustrates an example configuration for the bearing pads 12 shown in FIG. 1. As shown in FIG. 2, the top foil 16 has a leading edge 20, a trailing edge 22, and a top surface 24 that extends between those edges. The top surface 24 includes a taper region 26 near the leading edge 20 and a flat land region 28 downstream of the taper region near the trailing edge 22. In the illustrated example, the taper portion 26 begins (the leading edge of the taper portion) at a point just downstream of the leading edge 20 of the top foil 16. As shown FIG. 2 and FIG. 3A, the top foil 26 tapers downward at an angle from the flat land region 28 (and the horizontal direction) along the taper region 26 so that the top foil gradually thins (is gradually reduced in thickness) as it is traversed from the flat land region toward the leading edge 20 (the taper angle is exaggerated in FIG. 3A). In the example of FIG. 3A, the top foil thins at a constant rate from the flat land region 28 to a point just downstream of the leading edge 20.

Unlike the taper region 26, the flat land region 28 of the top foil 16 is horizontally arranged such that the top surface 24 is generally parallel with a bottom surface 30 of the top foil within the flat land region. In such a case, the top foil 16 is of constant thickness across that region 28. This is also illustrated in FIG. 3A. As shown in FIG. 2, the flat land region 28 is supported by the compliant support element 18, which in this example comprises a radially corrugated bump foil.

With further reference to FIG. 2, an arcuate pocket recess or groove 32 is formed in the top surface 24 of the top foil 16 near the leading edge 20 of the top foil. In the illustrated example, the pocket recess 32, which forms an inward depression or cavity within the top foil 16, extends from the leading edge 20, along the entire length of the taper region 26, and further along a small leading portion of the flat land region 28. The pocket recess 32 is defined by a base 34, opposed arcuate side walls 36, and an end wall 38 and forms a leading opening 42 into which gas can enter the pocket recess during bearing operation. In the illustrated example, the side walls 36 are parallel to each other so that the pocket recess 32 has a constant width along its length, which extends from the opening 42 to the end wall 38.

As can also be seen in FIG. 2, as well as FIG. 3A, as the taper region 26 does not extend all the way to the leading edge 20 of the top foil, the top foil 16 includes a small flat leading region 40 upstream of the taper region that forms the leading edge. As with the flat landing region 28, this region 40 of the top surface 24 of the top foil 16 is generally parallel with the bottom surface 30 of the top foil so that the top foil has a constant thickness across that region. Because the pocket recess 34 extends across each of the flat leading region 40, the taper region 26, and part of the flat land region 28, the base 34 of the pocket grove is horizontal at the leading edge 20, angled upward along the taper region, and horizontal again within the flat land region. Accordingly, the base 34 of the pocket recess 32 can be said to comprise three distinct surfaces or portions.

Figure 3B:
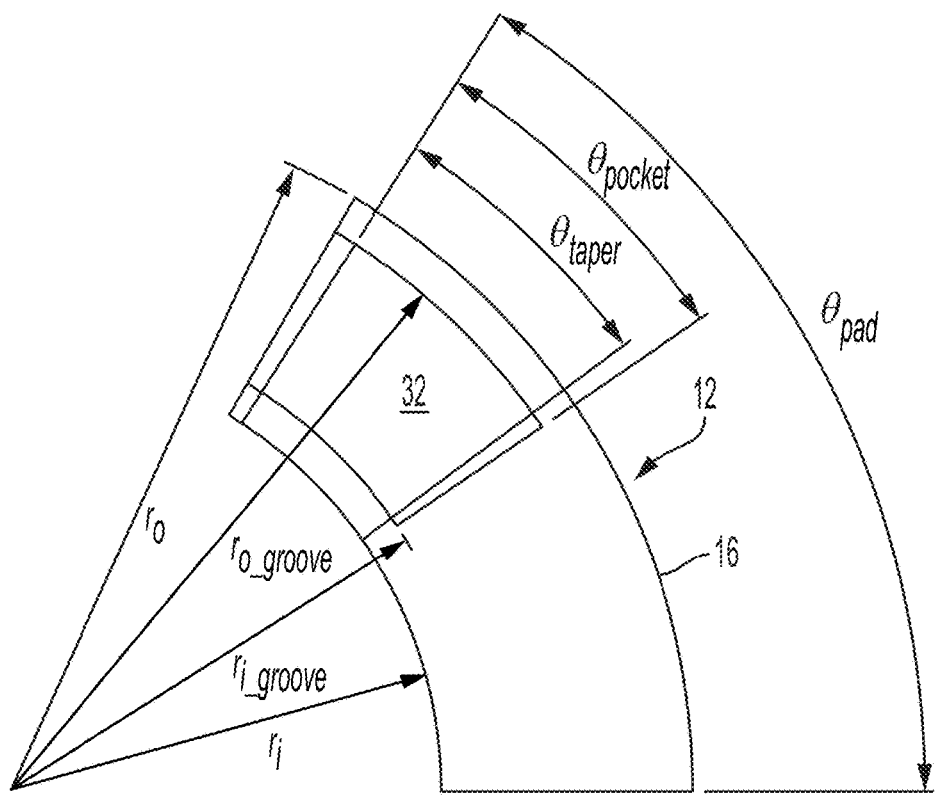
FIG. 3B is a top view of the top foil of FIG. 3A that identifies further geometric parameters of the top foil.
Figure 3C:
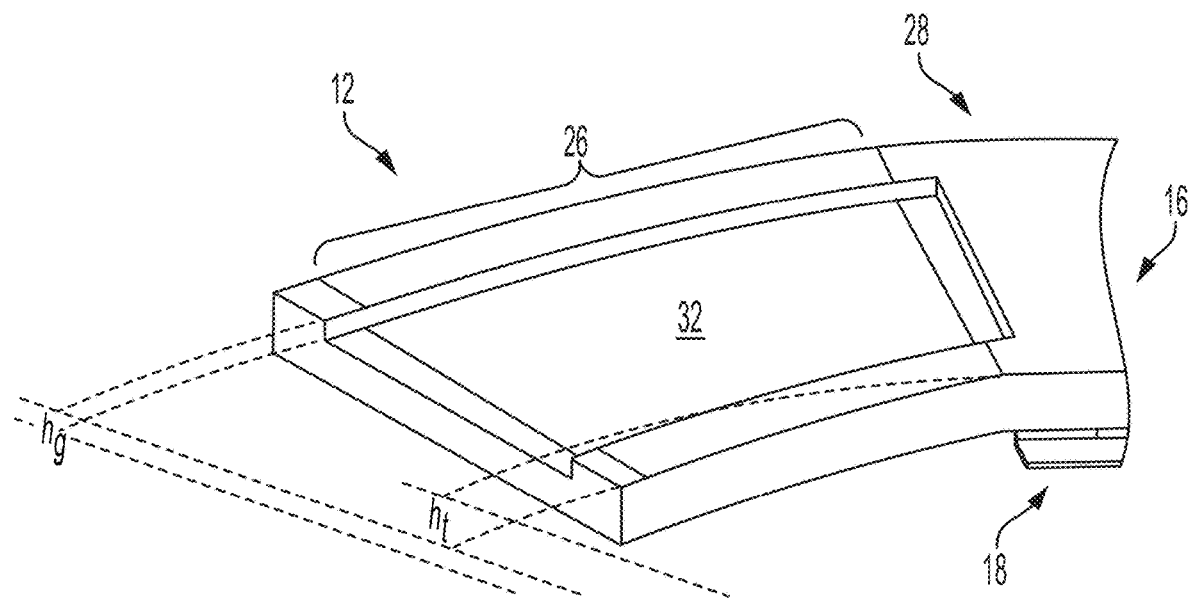
FIG. 3C is a detail perspective view of the top foil of FIGS. 3A and 3B that still further geometric parameters of the top foil.

FIGS. 3A-3B identify various geometrical parameters for the above-described top foil 26, which can also apply to other configurations of taper-flat-recess pads. Beginning with FIG. 3A, the top foil 26 is schematically illustrated along with a thrust runner 44 that rotates relative to the top foil. Parameters identified in the figure include the height of the taper, $h_t$, and the recess (groove) depth or height, $h_g$. Referring next to FIG. 3B, identified are angular parameters including the pad angle, $\theta_{pad}$, the pocket angle $\theta_{pocket}$, and the taper angle, $\theta_{taper}$. Also identified are radial parameters including the pad outer radius, $r_o$, the pad inner radius, $r_i$, the outer recess (groove) radius, $r_{o\_groove}$, and the inner recess or (groove) radius, $r_{i\_groove}$. Finally, FIG. 3C also identifies the taper depth or height, $h_t$, and the recess (groove) depth or height, $h_g$, from a different angle than FIG. 3A.

Each of the above parameters can be significant in terms of achieving a desired performance. Of particular note are $\theta_{pocket}$ and $\theta_{taper}$. In some embodiments, $\theta_{pocket}$ can be larger than $\theta_{taper}$, as in the case of the example shown in FIGS. 2-3, while in other embodiments, $\theta_{pocket}$ can be equal to or smaller than $\theta_{taper}$. It is also noted that, in some embodiments, the ratio between the taper angle and the pad angle, i.e., $\theta_{taper}/\theta_{pad}$, can be within the range of approximately 0.1 to 0.7.

Parametric Study of Pocket Recess Dimensions

A parametric study was performed to evaluate the influence of the combined pocket-taper-flat configuration on bearing performance independent from the influence of foil flexibility. In the study, a 6-pad rigid bearing was used that had a pad configuration similar to that shown in FIG. 2. The geometrical parameters of the bearing pads were optimized and fixed to the values shown in Table 2.

TABLE 2

Bearing Geometry

| Parameters | | Parameters | |
|---|---|---|---|
| Pad outer radius, $r_i$ | 19 mm | Groove angle, $\theta_{pocket}$ | 24° |
| Pad inner radius, $r_o$ | 12.7 mm | Taper angle, $\theta_{taper}$ | 18° |
| Taper height, $h_t$ | 35 µm | Pad angle, $\theta_{pad}$ | 60° |
| Groove depth, $h_g$ | 5 µm | Groove inner radius, $r_{i\_groove}$ | 13.6 mm |
| Speed | 140 krpm | Groove outer radius, $r_{o\_groove}$ | 18.1 mm |
| Nominal clearance | 40 µm | Ambient pressure | 1 bar |
| Min. film thickness | 3 µm | Ambient temperature | 150° C. |

Figure 4:
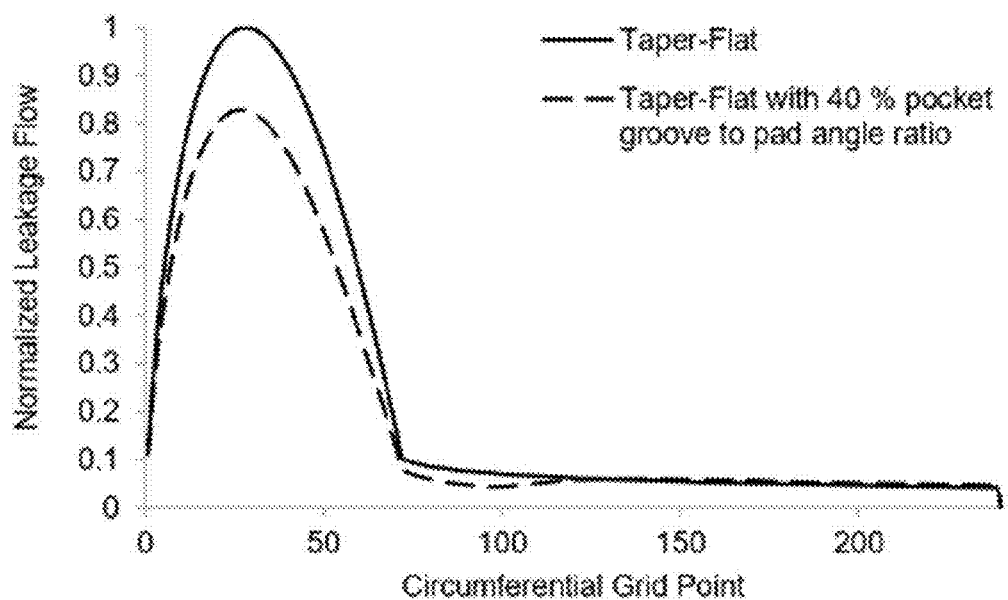
FIG. 4 is a graph that shows leakage flow across example top foils along the radial direction, normalized to the maximum nodal flow rate in taper-flat configuration.

The leakage flow rate, calculated using equation (1) below, can help reveal the effect of the pocket recesses. FIG. 4 shows the amount of leakage flow along the circumferential direction normalized to the maximum nodal flow rate in the taper-flat configuration case. At the recess location, the radial leakage flow is mitigated resulting in a total reduction of 17% compared to the total leakage flow of a taper-flat bearing. This contributes directly to the amount of pressure preserved inside the bearing.

$$Q_L = -\frac{R}{6\mu} \int_0^{\theta_{pad}} h^3 \frac{\partial p}{\partial z_{edge}} d\theta \qquad (1)$$

The bearing's static performance was analyzed by solving steady state Reynolds equation (2) for an ideal gas. Film thickness is defined such that pocket recess depth is added to the film thickness at the recess region, as shown in equation (3).

$$\frac{1}{r}\frac{\partial}{\partial r}\left(r\frac{ph^3}{12\mu}\frac{\partial p}{\partial r}\right) + \frac{1}{r}\frac{\partial}{\partial \theta}\left(\frac{ph^3}{12\mu}\frac{\partial p}{r\partial \theta}\right) = \frac{r\omega}{2}\frac{\partial(ph)}{r\partial \theta} \qquad (2)$$

$$h = \begin{cases} h^* + h_g & \text{inside pocket recess} \\ h^* & \text{else} \end{cases}$$

and $$h^* = \begin{cases} h_f + h_t\left(1 - \dfrac{\theta}{\theta_{taper}}\right) & 0 < \theta < \theta_{taper} \\ h_f & \theta_{taper} < \theta < \theta_{pad} \end{cases} \qquad (3)$$

The bearing geometry and operating parameters presented in Table 2 are suitable for GFTBs used in a micro gas turbine (MGT), high-speed oil-free motors, and automotive fuel cell air compressor applications. The pocket recess depth should not exceed a limit at which flow recirculation starts occurring at the recess walls, which leads to loss in pressure gradient. In most cases, the recess depth is approximately 1 to 2 times the minimum film thickness.

Figure 5:
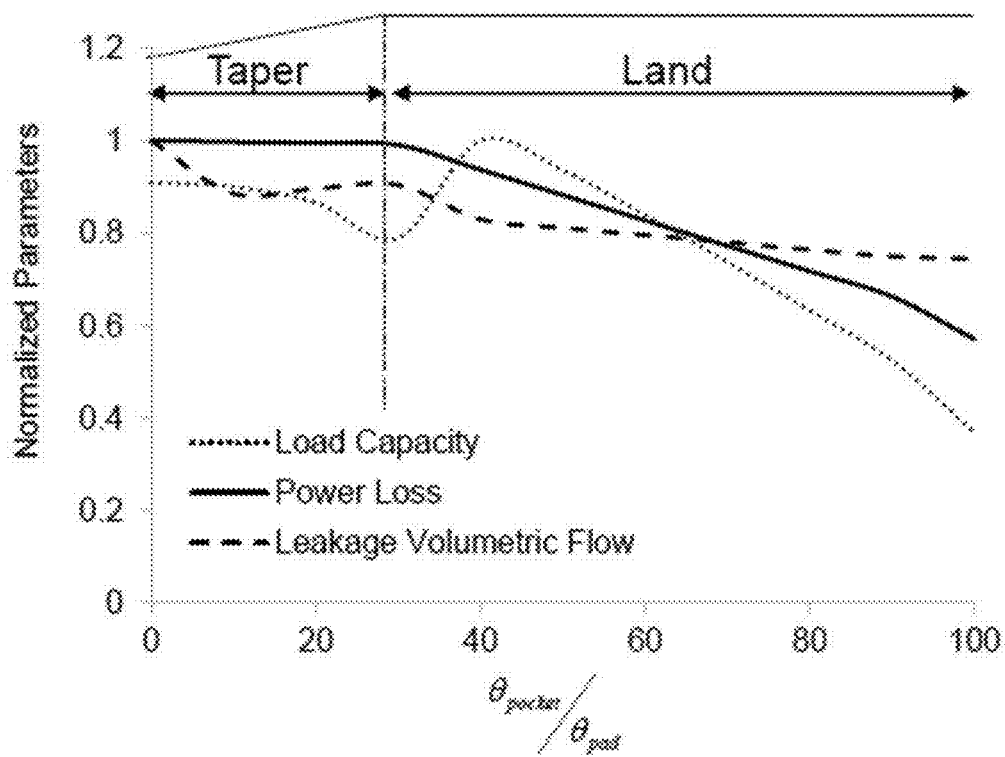
FIG. 5 is a graph that shows the influence of a pocket recess angle on bearing performance (parameters are normalized to their maxima).

The parametric study of pocket recess angular span, width, and depth was conducted to understand the influence of these parameters on bearing performance. FIG. 5 shows the effect of recess angle-to-pad angle ratio. Load capacity, power loss, and volumetric leakage flow were normalized with the maxima values from each pocket angle value simulation. A recess-to-pad ratio of zero reflects the traditional taper-flat configuration. There is little change in load carrying capacity when the pocket recess ends inside the tapered portion because the bearing film thickness is large compared to the recess depth and the pressure is low in this region. If the taper angle-to-pad ratio and the recess angle-to-pad ratio are the same, the simulation shows a dip in load capacity. This is because the recess interrupts the taper-to-flat transition, causing loss in pressure gradient along the circumferential direction.

The bearing load capacity reaches a maximum value when the angle ratio is about 0.4. Beyond this point, load capacity drops significantly. Power loss is a function of shear stress generated by Couette ($\tau_c$) and Poiseuille ($\tau_p$) flow, as shown in equation (4). The pocket recesses help increase the film thickness and, therefore, reduce the shear stress due to Couette flow.

$$L = \omega \int_0^{2\pi}\int_{R_t}^{R_o} r^2(\tau_P + \tau_C)d\theta dr = \omega\int_0^{2\pi}\int_{R_t}^{R_o} r^2\left(\frac{h}{2r}\frac{dp}{d\theta} \frac{\mu r\omega}{h}\right)d\theta dr \quad (4)$$

Figure 6:
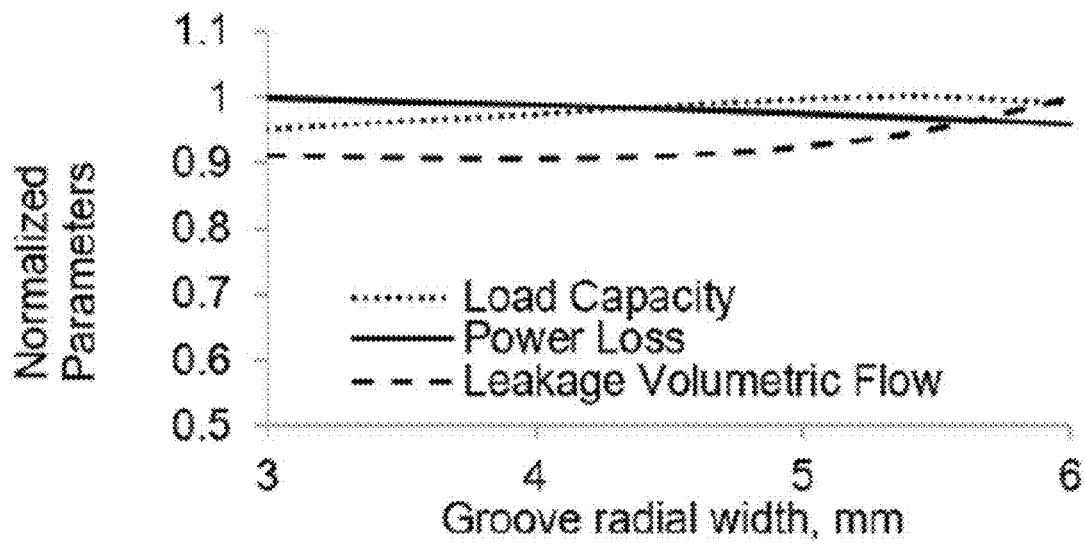
FIG. 6 is a graph that shows the influence of pocket recess radial width on bearing performance with a recess angle/pad angle ratio=0.4 (parameters are normalized to their maxima).
Figure 7:
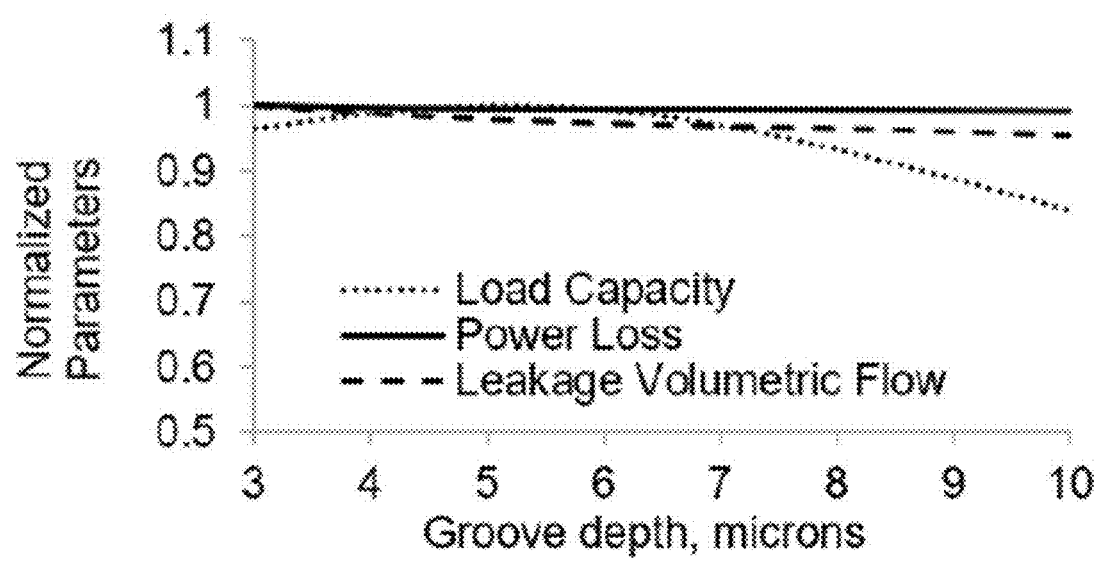
FIG. 7 is a graph that shows the influence of pocket recess depth on bearing performance with a recess-to-pad ratio=0.4, and recess width=4.5 mm (parameters are normalized to their maxima).

FIGS. 6 and 7 show the influences of the pocket recess' radial width and depth on the bearing performance with a recess angle-to-pad angle ratio of 0.4. These parameters have less influence on the bearing power loss because the power loss is driven by the area of the minimum film thickness region. The change in area of this region is negligible when varying the recess width and constant when varying recess depth.

According to the simulated results, maximizing the pocket recess' radial width is beneficial to the bearing performance. As mentioned earlier, the recess depth should be approximately 1 or 2 times the bearing minimum film thickness. In this case, a 5-µm deep recess provided the best performance.

Case Study of the Effect of the Pocket Recess Pattern on GFTBs

A GFTB having bearing pads illustrated in FIG. 2 and having the optimized parameters listed in Table 2 was simulated using fused deposition modeling (FDM) to solve for plate deflection. This modeling can reveal whether the foil flexibility would compromise the benefits of pocket recesses. The fluid is assumed to be air as an ideal gas having isothermal and laminar flow. The model uses time a marching scheme to calculate steady state pressure and foil deflection by solving the transient Reynolds equation (5) and the thin plate deflection equation (6) at every time step.

$$\frac{1}{r}\frac{\partial}{\partial r}\left(r\frac{\text{ph}^3}{12\mu}\frac{\partial p}{\partial r}\right) + \frac{1}{r}\frac{\partial}{\partial \theta}\left(\frac{\text{ph}^3}{12\mu}\frac{\partial p}{r\partial\theta}\right) = \frac{r\omega}{2}\frac{\partial(\text{ph})}{r\partial\theta} + \frac{\partial(\text{ph})}{\partial t} \quad (5)$$

$$\frac{\partial^4 w}{\partial r^4} + \frac{2}{r}\frac{\partial^3 w}{\partial r^3} - \frac{1}{r^2}\frac{\partial^2 w}{\partial r^2} + \frac{1}{r^3}\frac{\partial w}{\partial r} + \\ \frac{2}{r^2}\frac{\partial^4 w}{\partial r^2 \partial\theta^2} - \frac{2}{r^3}\frac{\partial^3 w}{\partial r\partial\theta^2} + \frac{4}{r^4}\frac{\partial^2 w}{\partial\theta^2} + \frac{1}{r^4}\frac{\partial^4 w}{\partial\theta^4} = \frac{p - k_{bump}w}{D} \quad (6)$$

Figure 8:
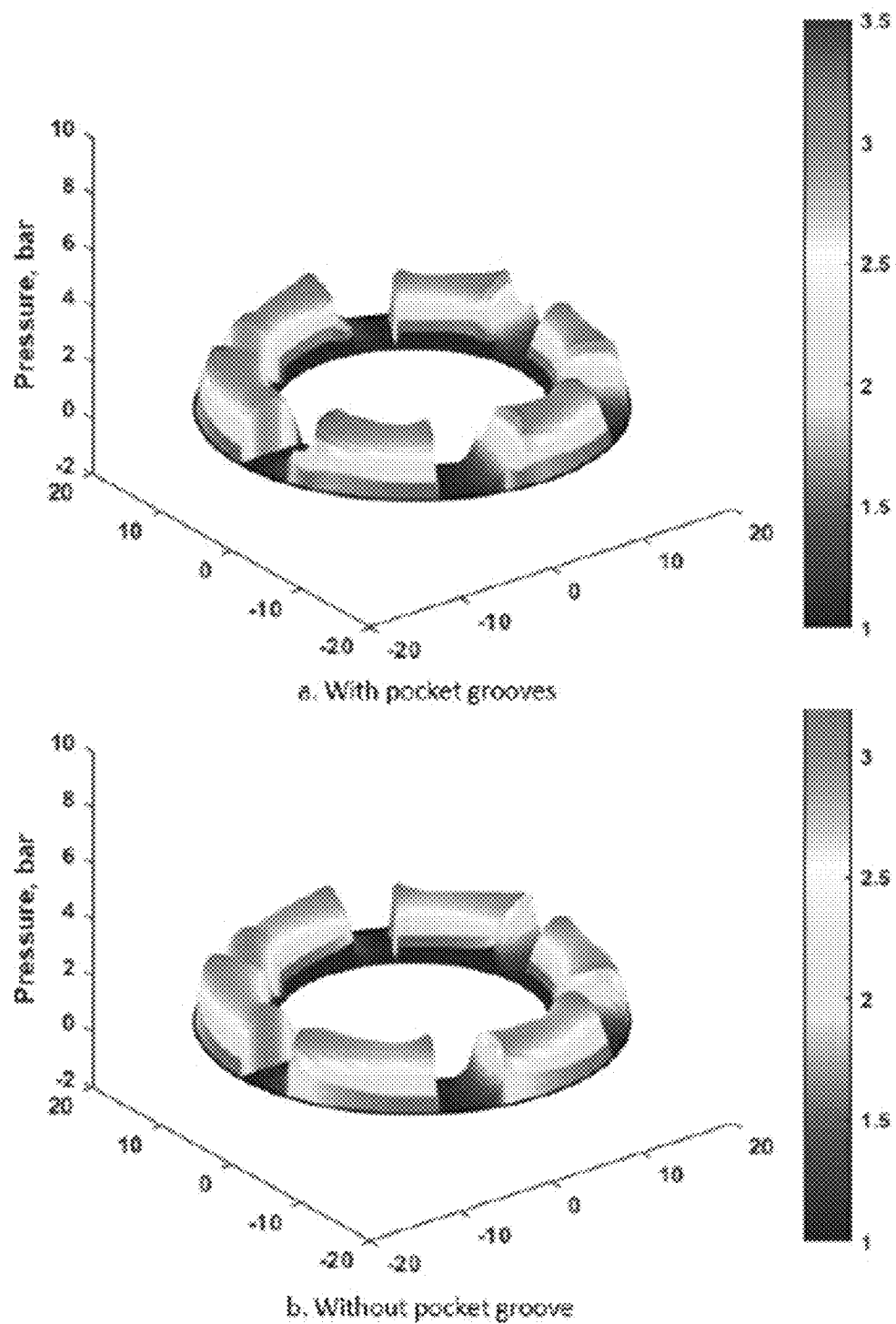
FIG. 8 shows pressure profiles of a 6-pad GFTB with pocket recesses (top) and without pocket recesses (bottom).
Figure 9:
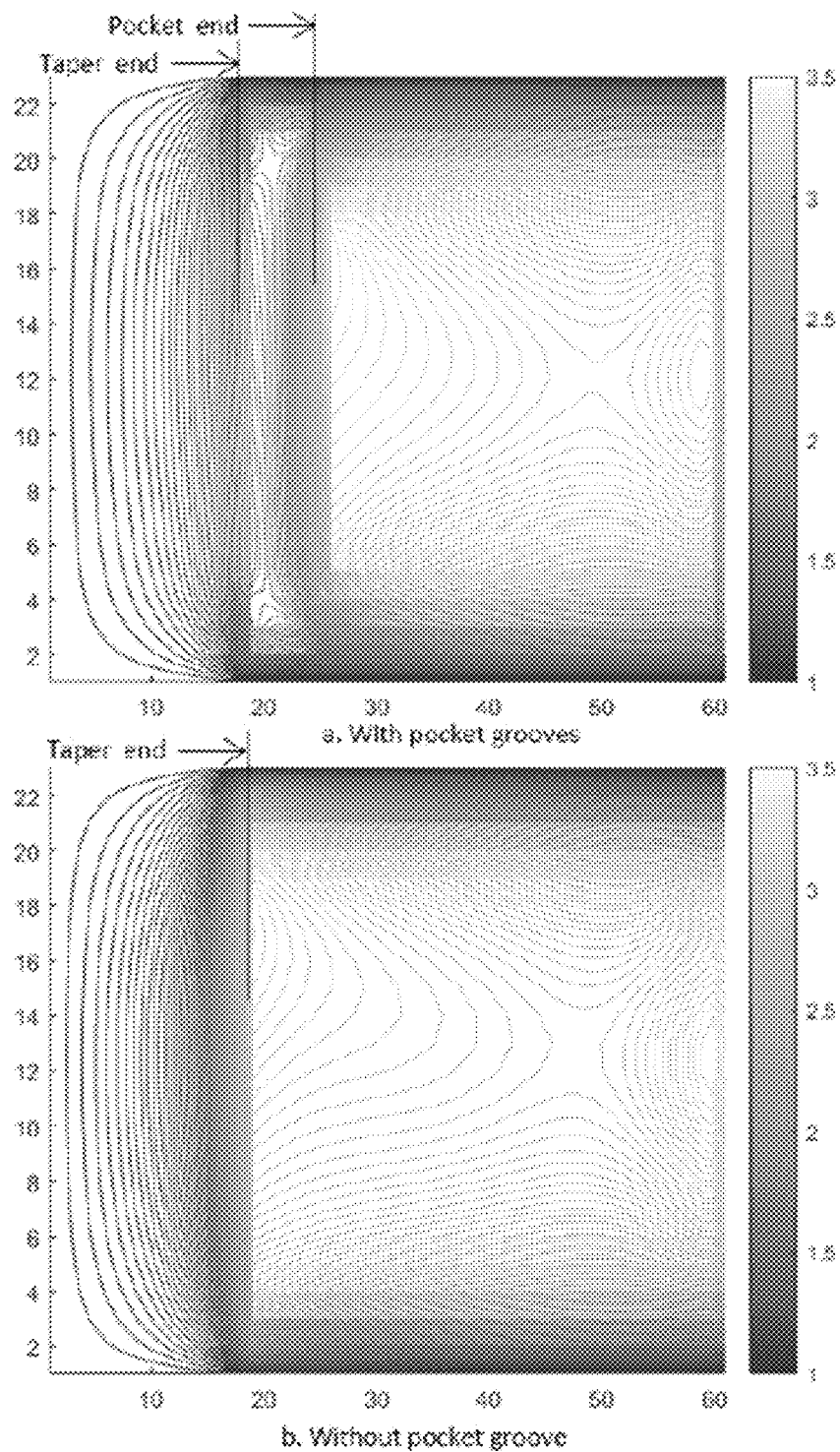
FIG. 9 shows pressure contours of a GFTB with pocket recesses (top) and without pocket recesses (bottom).
Figure 10:
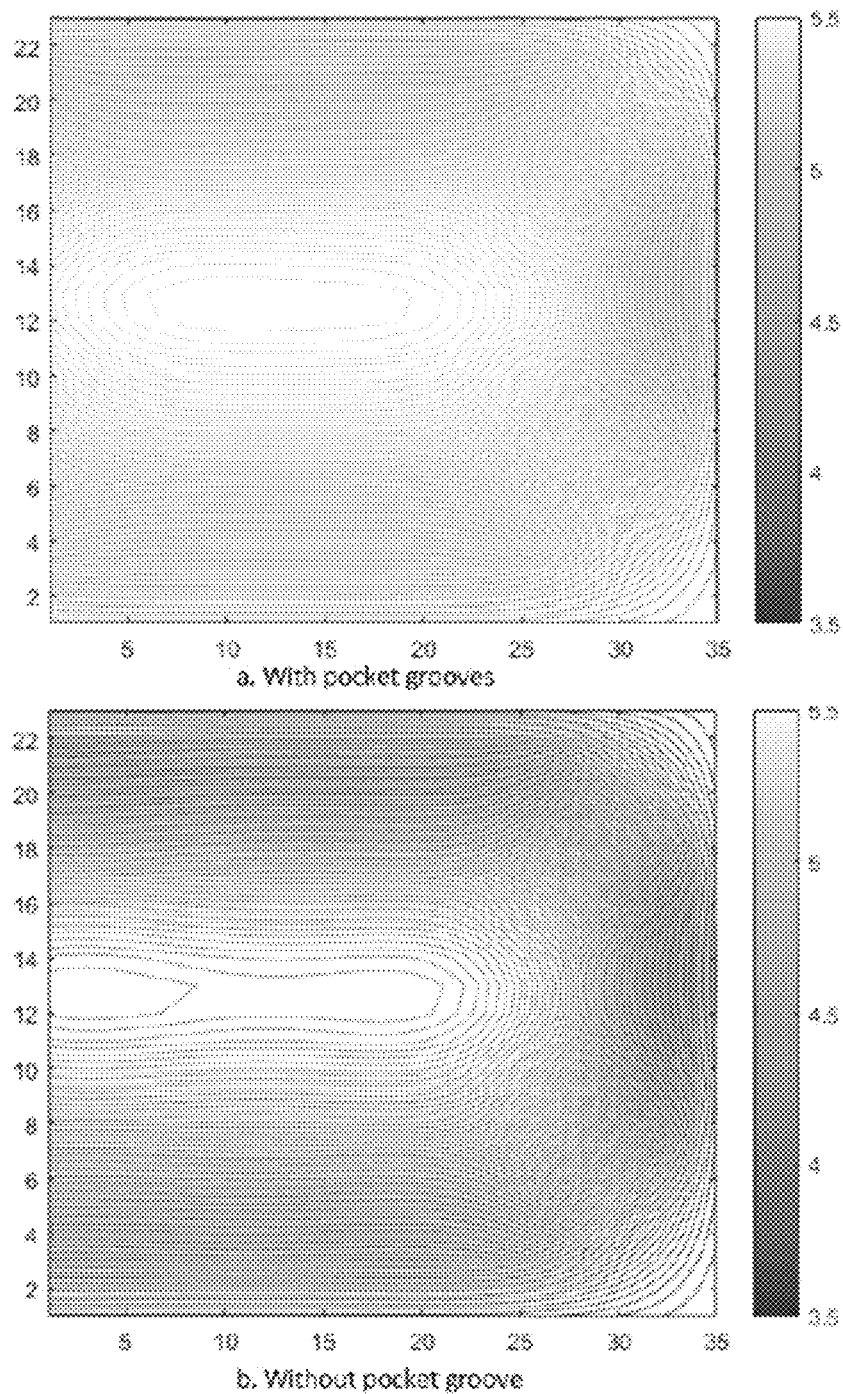
FIG. 10 show pressure contours for film thickness at the flat land region of a GFTB pad with pocket recesses (top) and without pocket recesses (bottom).

FIGS. 8 and 9 show the pressure distribution of a taper-flat configuration with and without pocket recesses. FIG. 10 shows the film thickness distribution at the flat land regions. The simulation was set to converge to a required load capacity of 70 N. The pocket recesses enabled the same bearing to retain slightly higher pressure and a considerably larger film thickness. In particular, the maximum pressure of the pocket bearing was 3.2 bar, as compared to 3 bar for a bearing without pocket recesses. The minimum film thickness of the bearing having pocket recesses was almost 1 µm larger than bearing without a pocket recess.

Figure 11:
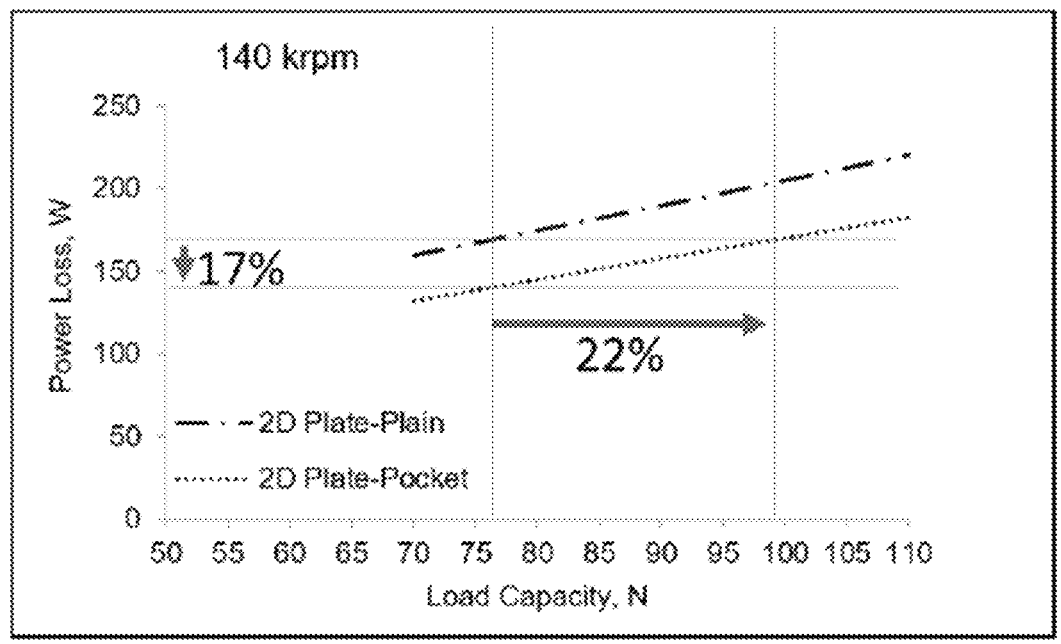
FIG. 11 is a graph that provides a comparison between GFTBs with pocket recesses and without pocket recesses at 140 krpm.

FIG. 11 shows an estimation of power loss at 140 krpm for taper-flat GFTBs with and without pocket recesses in a highly loaded operating condition (i.e., 70 N and 110 kPa to 100 N and 160 kPa). The figure shows that, by adding the pocket recess pattern, the bearing maximum load capacity increased by 22 percent. On the other hand, the pocket recess reduced power loss by 17 percent, assuming the same loading conditions.

Experimental Verification

Experiments were performed to evaluate the effects of incorporating pocket recesses into the top foils of GFTBs. The recesses were added to top foils having thicknesses of 127 µm (5 mils) and 203 µm (8 mils). The 203-µm thick top foil had a sharp bending transition from the tapered portion to the flat portion. Due to a higher bending stiffness of the thicker top foil, a bend was needed to get the top foil flap to sit flat on the bump foil. This prevents excessive mechanical preload and rubbing at top foil trailing edge.

Figure 12:
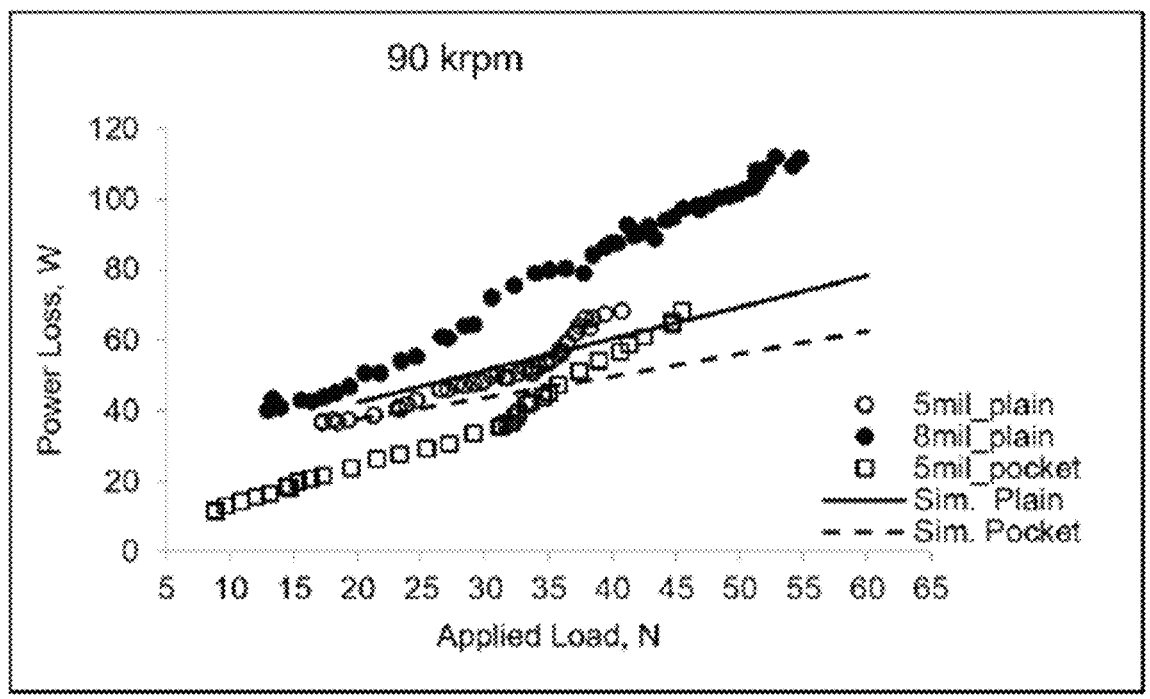
FIG. 12 is a graph that shows power loss versus applied load at 90 krpm with 127- and 203-μm thick top foils.

FIG. 12 shows compiled data from testing the GFTBs at 90 krpm. The slopes of the experimental data were steeper than predicted. The predicted power loss was calculated assuming the external load was equally distributed among all the pads. However, in reality, one or two pads sustain higher external loads than others, which dictates higher power loss values. In addition, the difference in the amount of vibration from the runner center to the outer diameter was about 2.5 µm at 140 krpm, which further exacerbated the bearing power loss. Nevertheless, the results show that bearings with pocket recesses in the top foils have lower power losses than bearings without such recesses. At low speeds, the observed bearing power losses of the taper-flat bearing having the 127-µm thick top foil agreed well with predictions. For the 203-µm thick top foil without pocket recesses, the higher foil bending stiffness as well as a manufacturing defect at the bend area resulted in the bearing power losses to be higher than those of the thinner top foil.

Figure 13:
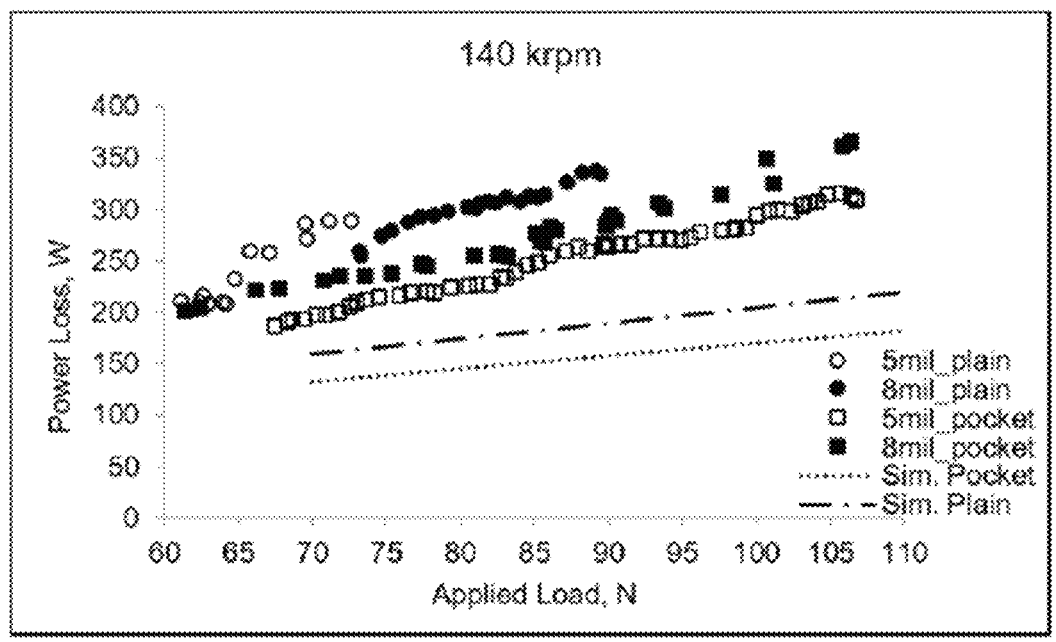
FIG. 13 is a graph that shows power loss versus applied load at 140 krpm.

Evidence of rubbing was identified by examining the bearing surface after testing. The GFTBs incorporating pocket recesses exhibited better performance at low speeds and high speeds for both top foil thicknesses. In the 140 krpm test (data presented in FIG. 13), the power loss of 203-µm pocket recess bearing was only slightly higher than that for the 127-µm pocket recess bearing because the high applied load forced the stiff top foil to sit nicely on the underlying bump foil.

Figure 14:
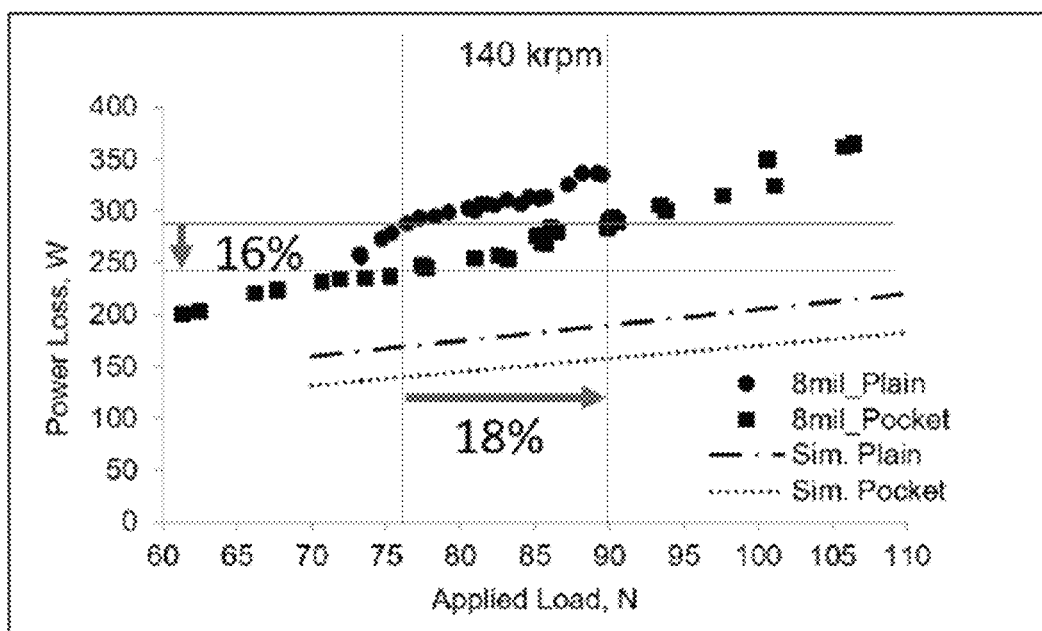
FIG. 14 is a graph that shows percentage of performance gain between prediction and experiment.

FIG. 14 is a graph that plots the experimental data of top foil thickness of GFTBs against the predictions presented in FIG. 11. The predictions suggested that the pocket recess bearing can have a 22% gain in load capacity or a 17% reduction in power loss compared to a no-recess bearing. Experimentally, the pocket recesses improved load capacity by 18% or reduced power loss by 16%, regardless of the test rig runner vibration and non-uniform bearing film thickness issues. Power loss due to surface roughness of the thrust runner and the top foil was not considered. For the plain GFTB case, operating above 75 N reduced the bearing minimum film thickness to about 1-2 μm because this bearing had a lower load capacity than that of the pocket recess GFTBs. At this operating parameter, the effect of surface roughness on bearing pressure should be considered in Reynolds equation.

CONCLUSIONS

In view of the above discussion, it can be appreciated that GFTBs offer many advantages over other bearings, including the ability to withstand high speed and high temperature conditions, low cost, light weight, generous allowance for component misalignment, and runout. From the studies and experiments it was determined that pocket recesses can work as a secondary pressure boosting mechanism in addition to the traditional taper-flat configuration. Also, radial leakage flow is mitigated at location of the pocket recess. In addition, by choosing the appropriate top foil thickness, the benefits of pocket recesses are immune to the foil sagging effect. Furthermore, bearing performance is most sensitive to the recess circumferential angle and is less affected by the recess radial width and depth. Moreover, due to runner vibration and the bearing's manufacturing defects, experiments showed the measured power loss to be higher than predicted. However, the test results clearly show that pocket recesses improve the GFTB performance by almost 18 percent in load capacity or reduce power losses by 11%. The benefits of the pocket recesses increase the bearing specific load capacity from 1.2 bar to 1.7 bar.

Pocket recesses of the type described above can be implemented in existing gas foil bearing high-speed systems to improve system efficiency. On the other hand, with the improved specific load capacity, the pocket recess GFTBs could potentially replace magnetic bearings in some applications, such as high-speed blowers, compressors, and gensets, thereby reducing system complexity and cost. The improvements in static performance combined with their lightweight nature makes pocket recess GFTBs more applicable to small unmanned aerial vehicles (UAVs), which require a robust support system under high load factors.

FURTHER EMBODIMENTS

Figure 15:
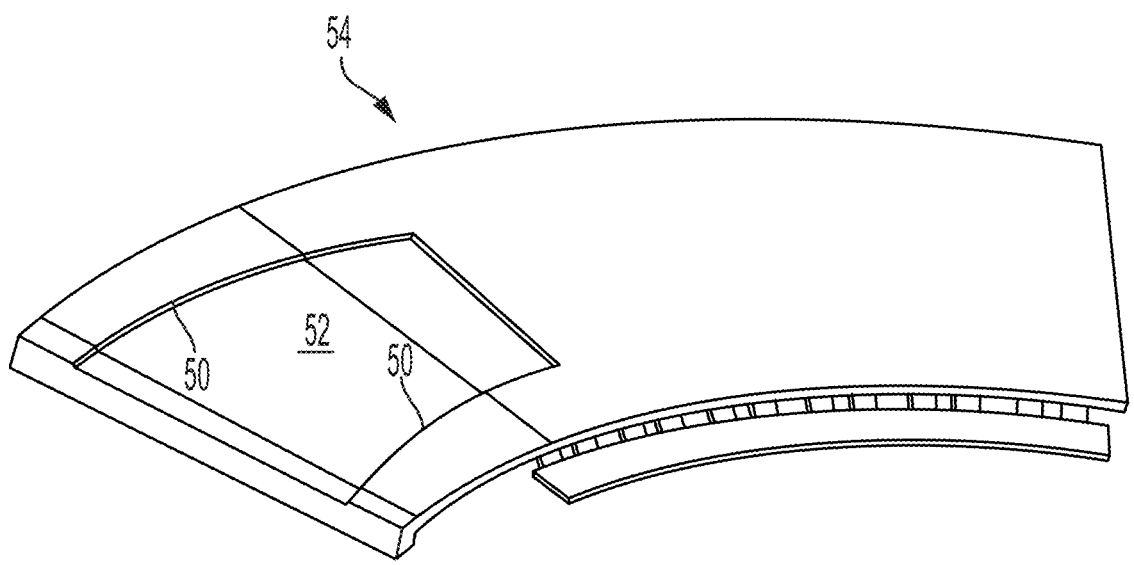
FIG. 15 is a perspective view of an alternative embodiment of a thrust pad that can be used in a GFTB.
Figure 16:
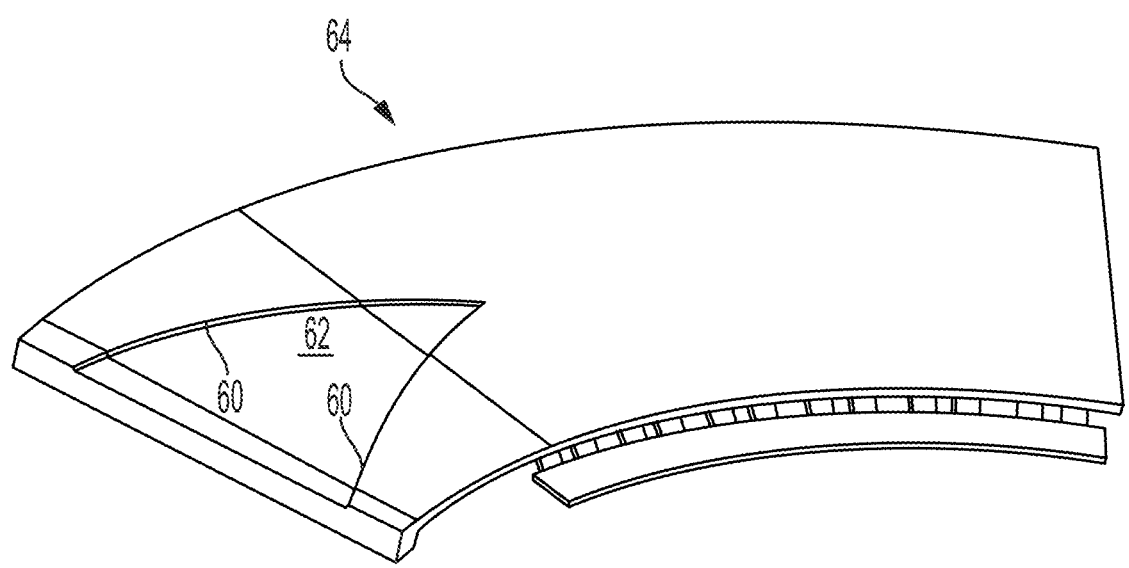
FIG. 16 is a perspective view of a further alternative embodiment of a thrust pad that can be used in a GFTB.

Although a particular embodiment of bearing pad was described in detail above, it is noted that alternative embodiments are possible. For example, the shape of the pocket recesses can be altered. As shown in FIG. 15, the side walls 50 of the pocket recess 52 of a top foil 54 can be nonparallel so as to form a trapezoidal shape. Furthermore, as shown in FIG. 16, the side walls 60 of the pocket recess 62 of a top foil 64 can intersect at a point so as to form a triangular shape. It is also noted that the side walls and/or end wall of a pocket recess can be straight or curved.

Figure 17:
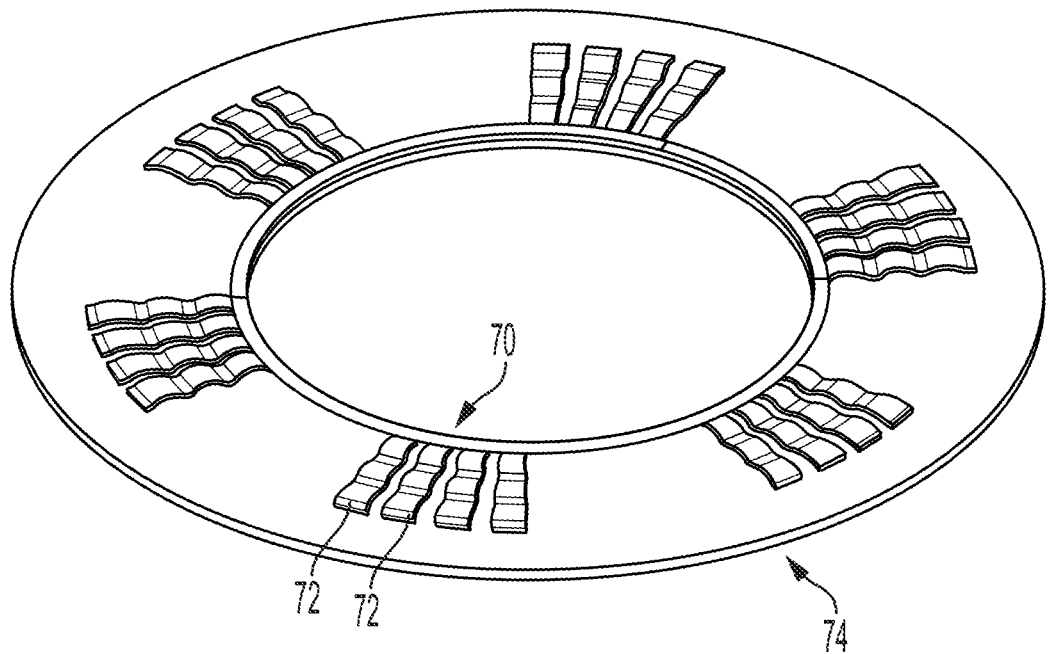
FIG. 17 is a perspective view of a radial corrugated bump foil configuration that can be used in a GFTB.
Figure 18:
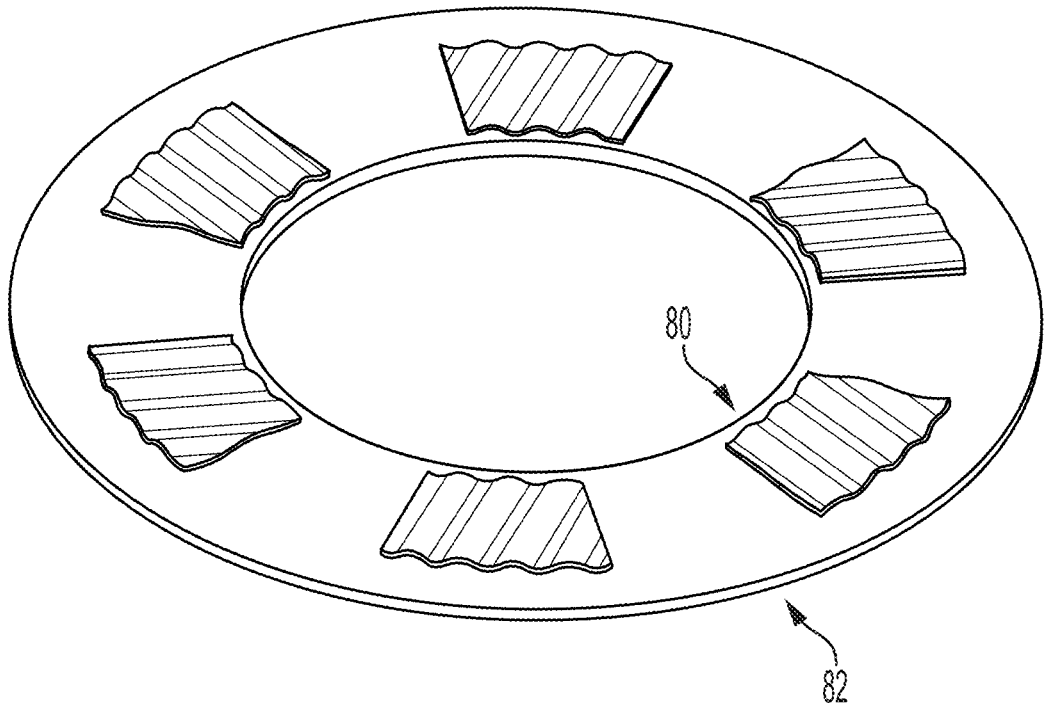
FIG. 18 is a perspective view of a tangential corrugated bump foil configuration that can be used in a GFTB.

It is also noted that various configurations can be used for the compliant support elements that support the top foils on the backing plate. For example, as shown in FIG. 17, a radial configuration can be used in which the compliant support elements 70 comprise discrete narrow elements or fingers 72 that extend radially outward and have corrugations that extend radially outward from the inner diameter of the backing plate 74 beneath each top foil. Alternatively, as shown in FIG. 18, each compliant support element 80 can extend in a tangential direction and have corrugations that likewise extend in a tangential direction around the arcuate backing plate 82.

Figure 19:
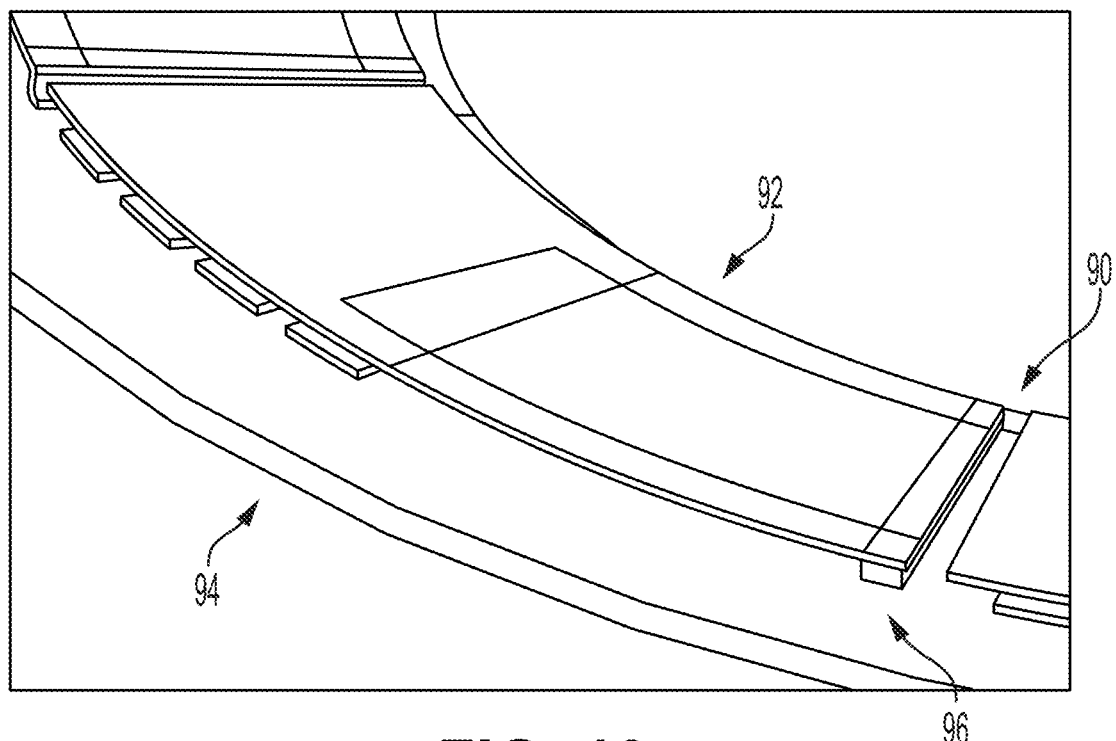
FIG. 19 is a detail perspective view of a GFTB having top foils whose leading edges are supported by a shim.
Figure 20:
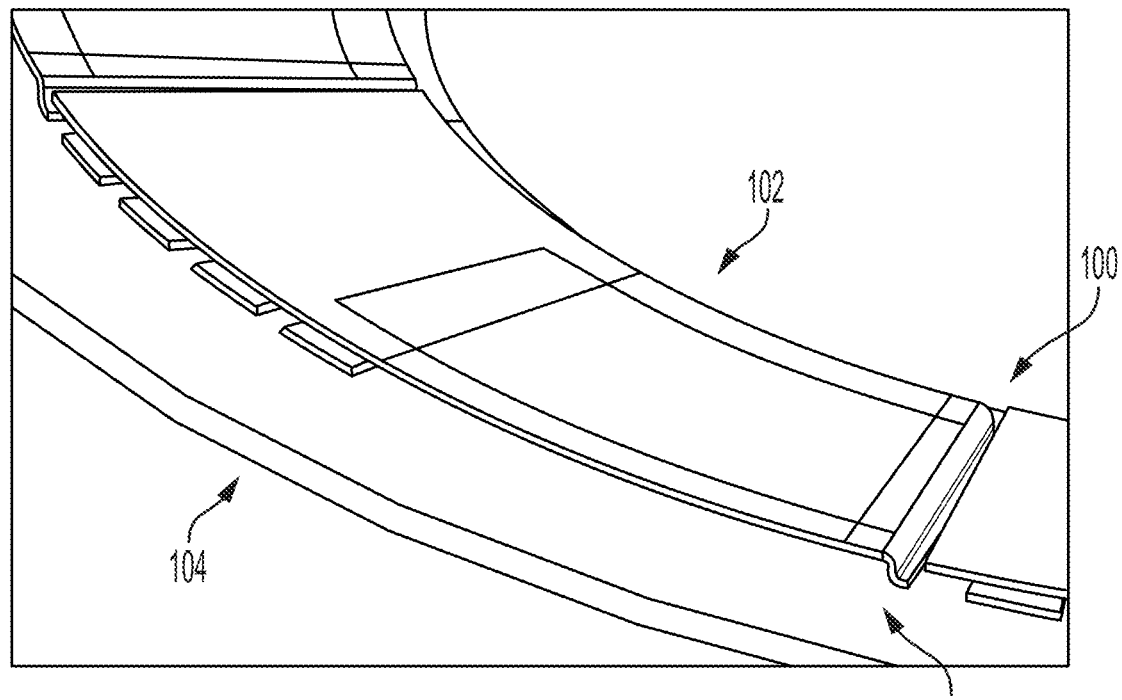
FIG. 20 is a detail perspective view of a GFTB having top foils whose leading edges are contoured to have similar effect as the shim in FIG. 19.

The manner in which the leading edges of the top foils are supported on the backing plate can also vary. For example, as shown in FIG. 19, the leading edge 90 of each top foil 92 can be supported on the backing plate 94 by a shim 96. Alternatively, as shown in FIG. 20, the leading edge 100 of each top foil 102 can be formed/contoured as an inwardly facing lip 106 sitting on the backing plate 104 directly.

Figure 21:
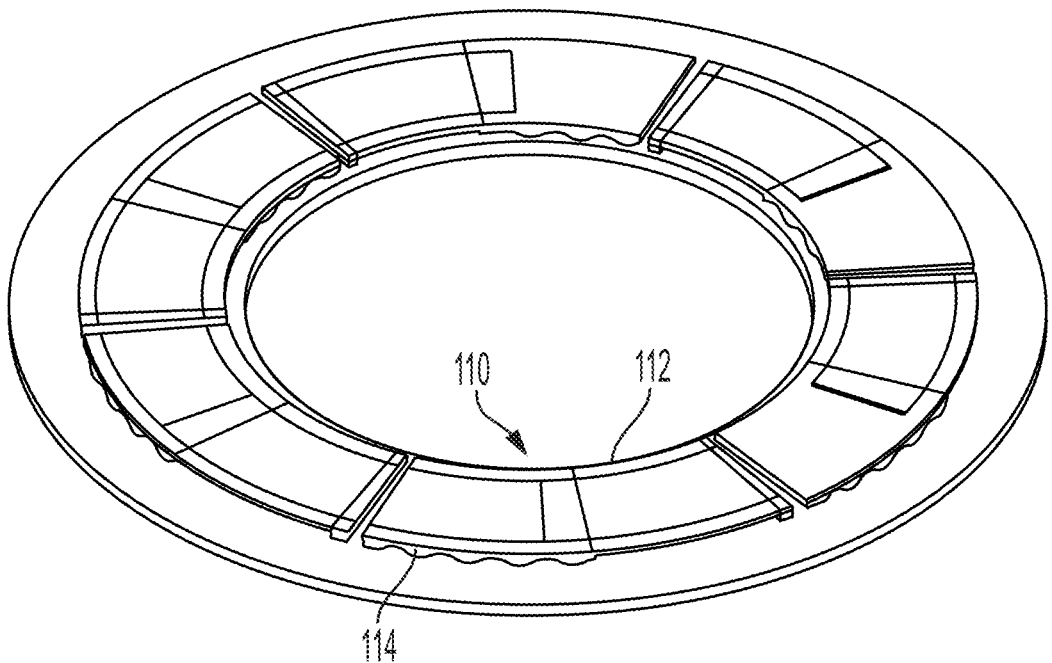
FIG. 21 is a perspective view of a GFTB having compliant support elements that extend only along a flat land region of their respective pads.
Figure 22:
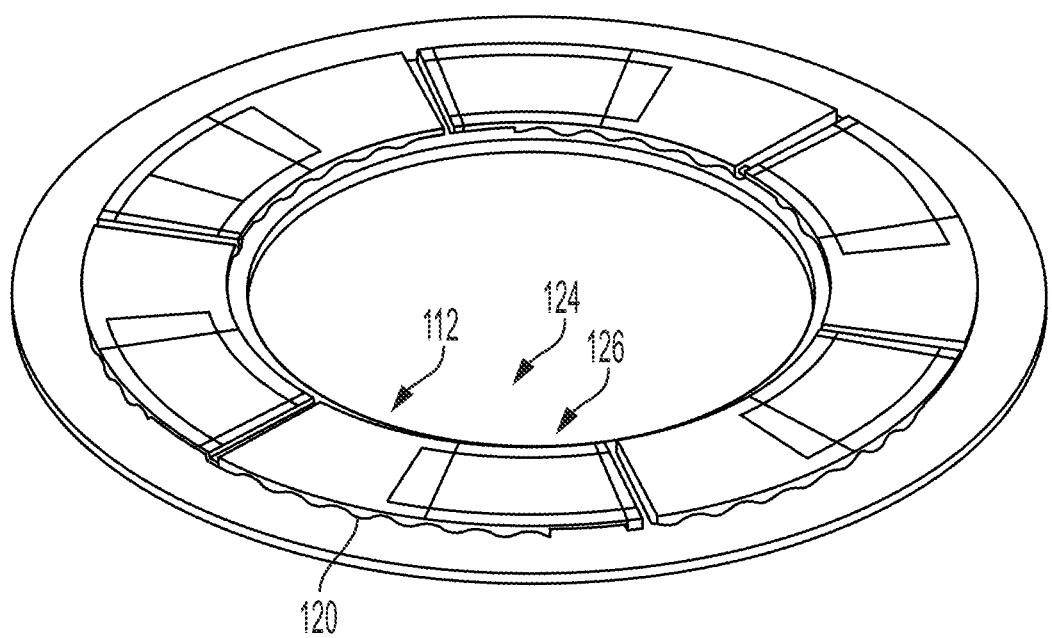
FIG. 22 is a perspective view of a GFTB having compliant support elements that extend along a flat land region and the taper region of their respective pads.

Finally, it is noted that the portion of the top foil that is directly supported by the compliant support element can be altered. As an example, FIG. 21 shows an embodiment in which only the flat land region 110 of a top foil 112 is directly supported by a compliant support element 114 (i.e., the element only extends along the flat land region). In FIG. 22, however, the compliant support element 120 directly supports (and extends along) not only the flat land region 122 of the top foil 124 but also a portion of the taper region 126 of the top foil.

The invention claimed is:

1. A gas foil thrust bearing comprising:
multiple arcuate bearing pads, each bearing pad including a top foil and a compliant support element, each top foil having a leading edge, a trailing edge, and a top surface that extends from the leading edge to the trailing edge, the top foil having a taper-flat-recess configuration in which the top surface includes a taper region located near the leading edge, a flat land region located near the trailing edge, and a pocket recess defined by a base, opposed side walls, and an end wall,
wherein a majority of the pocket recess exists within the taper region, and
wherein the pocket recess has a leading opening that extends across a majority of a radial width of the top foil.

2. The gas foil thrust bearing of claim 1, wherein the pocket recess also extends along a portion of the flat land region.

3. The gas foil thrust bearing of claim 1, wherein the side walls of the pocket recess are parallel.

4. The gas foil thrust bearing of claim 1, wherein the side walls of the pocket recess are nonparallel.

5. The gas foil thrust bearing of claim 4, wherein the side walls of the pocket intersect at a point.

6. The gas foil thrust bearing of claim 1, wherein a ratio between a taper angle and a pad angle of each top foil is approximately 0.1 to 0.7.

7. The gas foil thrust bearing of claim 1, wherein the compliant support elements comprise corrugated bump foils.

8. The gas foil thrust bearing of claim 7, wherein corrugations of the bump foils extend in a radial direction of the bearing.

9. The gas foil thrust bearing of claim 7, wherein corrugations of the bump foils extend in a circumferential direction of the bearing.

10. The gas foil thrust bearing of claim 1, wherein the compliant support elements extend only along the flat land region of the top foils.

11. The gas foil thrust bearing of claim 1, wherein the compliant support elements extend along the flat land region and a portion of the taper region of the top foils.

12. The gas foil thrust bearing of claim 1, wherein the leading edges of the top foils are supported by shims.

13. The gas foil thrust bearing of claim 1, wherein the leading edges of the top foils are formed as inwardly extending lips configured to directly contact a backing plate of the bearing.

14. An arcuate top foil configured for use in a gas foil thrust bearing, the top foil comprising:
a leading edge;
a trailing edge; and a top surface that extends from the leading edge to the trailing edge, the top foil having a taper-flat-recess configuration in which the top surface includes a taper region located near the leading edge, a flat land region located near the trailing edge, and a pocket recess defined by a base, opposed side walls, and an end wall, wherein a majority of the pocket recess exists within the taper region, and wherein the pocket recess has a leading opening that extends across a majority of a radial width of the top foil.

15. The top foil of claim 14, wherein the pocket recess also extends along a portion of the flat land region.

16. The top foil of claim 14, wherein the side walls of the pocket recess are parallel.

17. The top foil of claim 14, wherein the side walls of the pocket recess are nonparallel.

18. The top foil of claim 14, wherein a ratio between a taper angle and a pad angle of each top foil is approximately 0.1 to 0.7.

19. The top foil of claim 1, wherein the arcuate pocket recess extends along the entire length of the taper region.

\* \* \* \* \*